United States Patent [19]

McBain et al.

[11] Patent Number: 5,342,554
[45] Date of Patent: Aug. 30, 1994

[54] VINYL-TERMINATED POLYESTERS AND POLYCARBONATES FOR FLEXIBILIZING AND IMPROVING THE TOUGHNESS OF COMPOSITIONS FROM UNSATURATED POLYESTERS AND FIBER REINFORCED PLASTICS MADE FROM THEM

[75] Inventors: Douglas S. McBain, Norton; Kevin P. LaJudice, Akron; Earl G. Melby, Uniontown, all of Ohio

[73] Assignee: GenCorp Inc., Fairlawn, Ohio

[21] Appl. No.: 1,355

[22] Filed: Jan. 7, 1993

[51] Int. Cl.$^5$ .................. C08L 67/06; C08L 67/07; C08L 63/10
[52] U.S. Cl. .................. 523/466; 523/457; 523/467; 523/514; 523/523; 523/527; 525/28; 525/31; 525/44; 525/168; 525/170; 525/468; 526/314
[58] Field of Search .................. 525/28, 31, 44, 170, 525/468, 168; 523/514, 523, 527, 457, 466, 467; 526/314

[56] References Cited

U.S. PATENT DOCUMENTS

| | | |
|---|---|---|
| 2,750,314 | 6/1956 | Bemmels . |
| 2,829,131 | 4/1958 | Greenspan et al. . |
| 2,838,478 | 6/1958 | Hillyer et al. . |
| 3,119,711 | 1/1964 | Starmann . |
| 3,429,951 | 2/1969 | Childers . |
| 3,437,517 | 4/1969 | Eilerman . |
| 3,538,043 | 11/1970 | Herold . |
| 3,555,112 | 6/1971 | Winkler et al. .................. 525/387 |
| 3,651,014 | 3/1972 | Witsiepe . |
| 3,718,714 | 2/1973 | Comstock .................. 525/170 |
| 3,827,230 | 8/1974 | Marzocchi et al. . |
| 3,888,645 | 6/1975 | Marzocchi . |
| 4,020,036 | 4/1977 | South, Jr. . |
| 4,031,165 | 6/1977 | Saiki et al. . |
| 4,051,199 | 9/1977 | Udipi et al. . |
| 4,076,767 | 2/1978 | Samejima . |
| 4,131,725 | 12/1978 | Udipi .................. 525/387 |
| 4,242,415 | 12/1980 | Feltzin et al. .................. 428/412 |
| 4,255,299 | 3/1981 | Daimon .................. 525/119 |
| 4,290,939 | 9/1981 | Bertsch .................. 525/438 |
| 4,309,473 | 1/1982 | Minamisawa et al. .................. 428/292 |
| 4,329,438 | 5/1982 | Yamori et al. .................. 525/64 |
| 4,341,672 | 7/1982 | Hsich et al. .................. 525/387 |

(List continued on next page.)

FOREIGN PATENT DOCUMENTS

| | | |
|---|---|---|
| 0234902 | 9/1987 | European Pat. Off. . |
| 0242027 | 10/1987 | European Pat. Off. . |
| 0273522 | 6/1988 | European Pat. Off. . |
| 0310167 | 4/1989 | European Pat. Off. . |
| 0317628 | 5/1989 | European Pat. Off. . |
| 305159 | 12/1988 | Japan .................. 525/44 |
| 2165548 | 4/1986 | United Kingdom . |

OTHER PUBLICATIONS

Database WPI Sep. 1992, Derwent Publications Ltd., London, GB; AN 92-354793 & JP-A-4 258 637 (Dainippon Ink & Chem KK) Sep. 14 1992, "abstract."
Database WPI, Week 9223, Derwent Publications Ltd., London, GB; AN 92-188159 & JP-A-4 121 756 (Fjuitsu Ltd) Apr. 22 1992, "abstract."
Journal of Applied Polymer Science, vol. 31, No. 1, Jan., 1986, New York, USA, pp. 55-63, Subhas C. Shit, Beni Madhab Mahoto, Mrinal M. Miati, Sukimar Maiti *New Block Copolymers II. Synthesis and Characterization of an ABA-Type Block Copolymer,* "abstract."

*Primary Examiner*—David Buttner
*Attorney, Agent, or Firm*—Robert F. Rywalski; Frank C. Rote, Jr.; Samuel B. Laferty

[57] ABSTRACT

Vinyl-terminated polyesters and vinyl-terminated aliphatic polycarbonates are described which improve the flexibility and elongation at failure of cured samples of unsaturated polyesters or vinyl ester resins both at room temperature and at high temperatures, and without significant loss of surface quality or other mechanical properties. Further, these polymers do not phase separate from uncured polyester resin/styrene solutions, do not significantly increase the initial viscosity of molding compositions in which they have been incorporated, and do not negate the effect of low shrinkage additives during cure.

25 Claims, 2 Drawing Sheets

U.S. PATENT DOCUMENTS

| | | | |
|---|---|---|---|
| 4,413,072 | 11/1983 | Hess | 525/28 |
| 4,419,487 | 12/1983 | Rowe | 528/38 |
| 4,478,963 | 10/1984 | McGarry | 523/205 |
| 4,515,710 | 5/1985 | Cobbledick | 252/511 |
| 4,524,178 | 6/1985 | Hefner et al. | 528/28 |
| 4,530,962 | 7/1985 | Alexander | 525/31 |
| 4,562,115 | 12/1985 | Hergenrother | 428/392 |
| 4,748,064 | 5/1988 | Harpell et al. | 428/114 |
| 4,783,544 | 11/1988 | Yokoshima | 526/314 |
| 4,833,210 | 5/1989 | Fujii et al. | 525/387 |
| 4,851,474 | 7/1989 | Willis | 525/92 |
| 4,851,476 | 7/1989 | Willis | 525/105 |
| 4,913,955 | 4/1990 | Noda et al. | 428/236 |
| 4,970,265 | 11/1990 | Willis | 525/383 |
| 4,981,916 | 1/1991 | Willis | 525/383 |
| 5,084,508 | 1/1992 | Kagaya et al. | 525/31 |
| 5,122,553 | 6/1992 | Takayama et al. | 523/514 |

VINYL-TERMINATED POLYESTERS AND POLYCARBONATES FOR FLEXIBILIZING AND IMPROVING THE TOUGHNESS OF COMPOSITIONS FROM UNSATURATED POLYESTERS AND FIBER REINFORCED PLASTICS MADE FROM THEM

FIELD OF THE INVENTION

This invention relates to a thermosetting unsaturated polyester or vinyl ester resin composition modified with a vinyl terminated flexibilizer polymer made from aliphatic polycarbonates, saturated polyesters, or polyesters wherein the diacids are saturated or aromatic. These thermosetting resins can be used in sheet molding, bulk molding, thick molding compounds or, in resin transfer molding.

BACKGROUND

Unsaturated polyester resins are well-known and useful materials for making molding compositions with broad application in the manufacture of automotive and other products. Unsaturated polyester resin compositions typically used for sheet molding compounds (SMC's) are prepared from the polycondensation of propylene glycol and maleic anhydride. Other polyesters are similar in that some of the maleic anhydride is replaced with another anhydride or dicarboxylic acid, or some of the propylene glycol is replaced with another glycol to achieve different properties. Common to these materials is the presence of reactive unsaturation in the polyester resin, a result of the maleic anhydride component or reactively unsaturated dicarboxylic acids used in the polycondensation. In the final polyester, much of the used in the polycondensation. In the final polyester, much of the unsaturation is internal in the resin and not exclusively at the ends.

One of the main deficiencies of cured unsaturated polyesters and fiber reinforced polyesters (FRP's) made from them is the inherent brittleness of the polymer matrix. Cracking, at room and elevated temperatures, is a principal cause of failure in production and in service of the molded parts. Improvements in crack resistance in resin materials for SMC's have been reported by the incorporation of flexible ethers (diethylene glycol) or acids (adipic acid) in the unsaturated polyester. This approach using the so-called flexible polyesters has been only moderately successful, since the modulus and high temperature properties of the molded composite significantly decline with increasing amounts of these materials, and frequently they are faulted as sacrificing too much in their mechanical properties and dimensional stability.

Further, rigid unsaturated polyesters which contain a high fumarate content have traditionally given the best surface quality when used with common low profile additives (LPA) to control shrinkage. Consequently, they have been the materials of choice for Class A automotive panels. As well as showing a great loss of mechanical properties, flexible polyesters sacrifice surface quality even when used with common LPA's. This has discouraged the use of such flexible unsaturated polyesters for vehicle panels.

A number of strategies for improving the toughness and crack resistance of polymeric materials have been demonstrated in thermoset epoxies. The most common and successful technique is the creation of a second elastomeric phase through a phase separation process during cure. This technique has found practice but limited success in unsaturated polyesters. In addition to limited improvements in mechanical properties, the addition of reactive liquid rubbers typical of this approach leads to high viscosities which are unacceptable for the manufacture of SMC's by traditional means. Further, the utility of rubber and liquid rubber additives is limited by the incompatibility of these materials with polyester resins, particularly as molecular weight of the additive increases. If a resin mixture or even an SMC paste mixture containing the rubber additive is allowed to stand under ordinary storage conditions, the rubber will ultimately separate. Finally, compositions incorporating such materials exhibit moderate shrinkage which is not easily controlled by the LPA, resulting in a surface quality unacceptable for automotive surface parts.

SUMMARY OF THE INVENTION

Vinyl-terminated polyesters and vinyl-terminated aliphatic polycarbonates free from internal unsaturation reactive in free radical crosslinking are described which improve the flexibility and elongation to failure of cured thermoset resins from unsaturated polyesters or vinyl ester resins. These vinyl-terminated polymers achieve these results without significant decreases-in modulus and with good molded surface quality not found in prior art modifications of thermoset polyesters. These vinyl-terminated polymers are generally soluble in the unsaturated polyester styrene solution, and these three components generally form a one phase blend upon cure.

BRIEF DESCRIPTION OF DRAWINGS

FIG. 1 shows the properties at room temperature while

FIG. 2 shows the properties at 149° C.

DETAILED DESCRIPTION OF THE INVENTION

Figure 1:
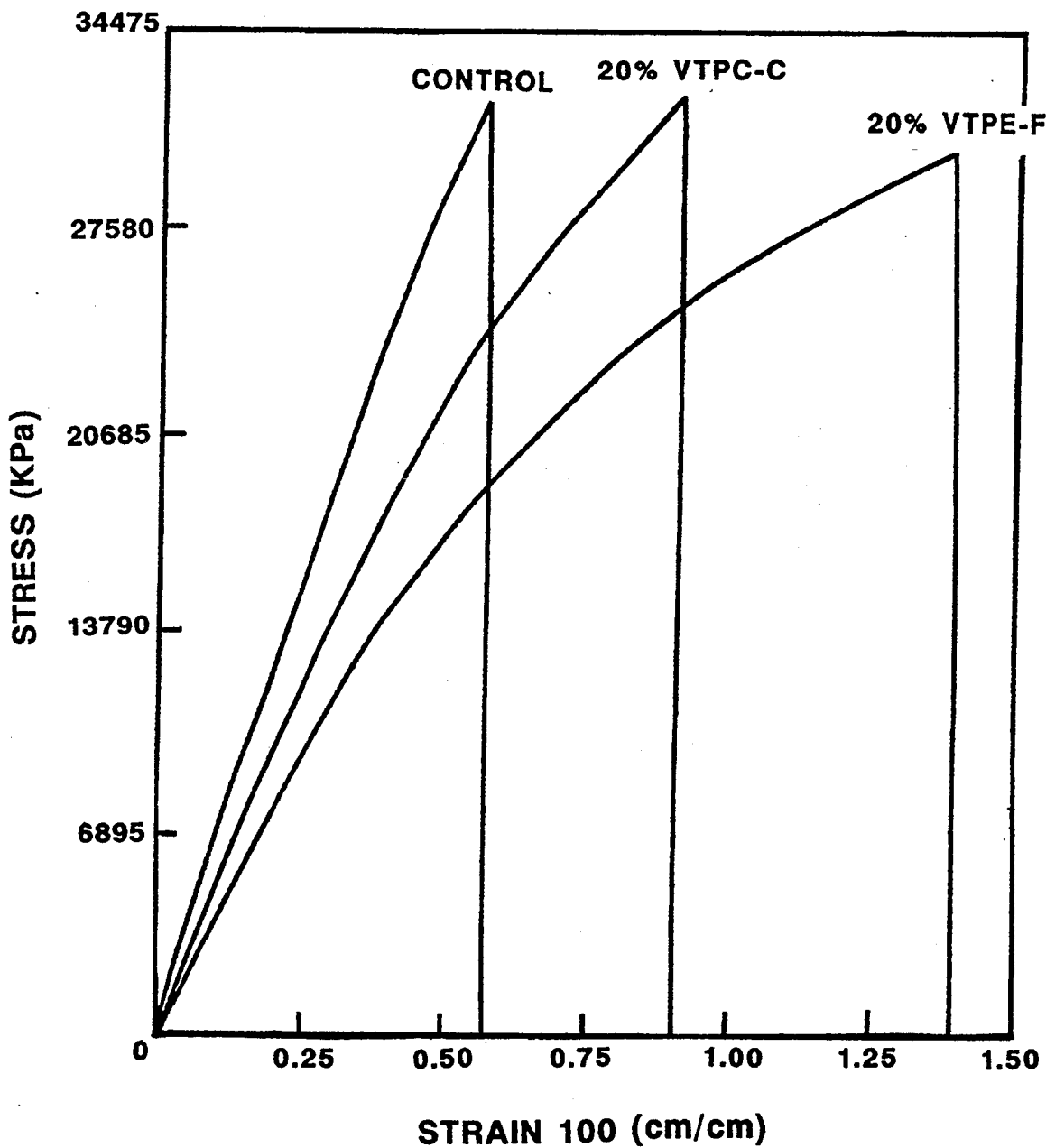
FIGS. 1 and 2 show the flexural stress-strain curves of conventional (control) unsaturated polyester resins and polyester resins with the vinyl terminated polymers of this invention at 20 weight percent based on the resins and monomers.

The invention described herein addresses the deficiencies of SMC by providing a tougher matrix, one which has a greater elongation at failure while still retaining good strength and modulus. Toughness is commonly defined as the area contained under a stress-strain curve at a given point, in this case failure. Although it is known that toughness may be improved through a high elongation material with low modulus, this is not acceptable for the contemplated uses of unsaturated polyesters. Therefore, modulus must be retained along with improved elongation to find usefulness as a molded material.

Vinyl-terminated polyesters and aliphatic polycarbonates or mixtures thereof, both the polyesters and the polycarbonates lacking internal unsaturation reactive in free radical reactions, are described which when added to unsaturated polyester molding compositions (notably for SMC) increase the toughness by increasing elongation with only small losses in modulus. These terminally reactive polymers lack internal unsaturation that participates in crosslinking with ethylenically unsaturated monomers under typical free radical polymerization conditions of unsaturated polyesters. These materials are also called vinyl terminated aliphatic polycarbonates or saturated/aromatic polyesters. These materials have good solubility in polyester resin/styrene solutions and do not phase separate on standing. The viscosities of mixtures containing these materials are not significantly greater than a control recipe. The addition of these materials does not lead to high shrinkage, and can even reduce the need for low profile additives (LPA) added to the composition to control shrinkage. This latter property of the invention is of particular importance in the fabrication of automotive body panels.

The materials which are this invention are different in that the unsaturation which they possess is exclusively at the ends of the polymer chains, hence the description "vinyl-terminated," and not internally incorporated in the backbone as is typical of the prior art. Addition of these materials to mixtures of common internally unsaturated polyesters and subsequent cure leads to thermoset networks with a greater molecular weight between cross-links (lower cross-link density) than the typical unsaturated polyester.

The typical unsaturated polyester resin develops many crosslinks along the backbone of the polymer using its unsaturation as crosslinking sites. In that the vinyl terminated polycarbonates and saturated-/aromatic polyesters lack these internal reactive unsaturation points, they only become crosslinked through their terminal vinyl group. The polymer network formed from their interaction during crosslinking is believed to consist of both unsaturated polyesters with their higher crosslink density (equivalent to low molecular weight between crosslinks) and the vinyl terminated aliphatic polycarbonates or polyesters with lower crosslink density (equivalent to higher molecular weight between crosslinks). The actual molecular weight between crosslinks of the vinyl terminated polymers is controlled by their molecular weight as they lack internal crosslinking sites.

When a vinyl-terminated polycarbonate or polyester free of internal reactive unsaturation, which has different molecular weight than the molecular weight between crosslinks developed in the unsaturated polyester is used in an unsaturated polyester composition, a bimodality can be developed in the molecular weight between crosslinks within the crosslinked composition.

This can be contrasted to adding saturated diacids in some proportions to the recipe for the unsaturated polyesters. Adding saturated diacids lowers the crosslink density (increasing the molecular weight between crosslinks). This typically lowers the modulus and increases the elongation of the crosslinked composition. However, the distribution of molecular weights between crosslinks would not be bimodal as with the vinyl-terminated aliphatic polycarbonates or vinyl terminated saturated/aromatic polyesters.

The vinyl terminated aliphatic polycarbonates and saturated/aromatic polyester additives of this invention achieve greater elongation while only decreasing modulus slightly. Further, the properties of the cured network are dependent on the flexibility, molecular weight, and concentration of the novel vinyl-terminated polyester. In this manner a rigid unsaturated polyester with utility for automotive body panels is made more flexible, and its elongation at failure increased. Its overall properties are improved without loss of surface quality due to the compatibility of the vinyl-terminated polymers with the unsaturated polyester resin.

The vinyl terminated saturated/aromatic polyesters and aliphatic polycarbonates lacking internal reactive unsaturation of this invention are made from hydroxyl or carboxyl terminated polyesters or polycarbonates as listed below, reacted with molecules having pendant vinyl groups through condensation reactions.

The saturated polyesters useful of this invention have molecular weights from about 200 to about 5,000, desirably from about 500 to about 2,000 or 3,000, and preferably from about 500 to about 1,200. They can be used to make vinyl-terminated polymers. In this application, saturated polyesters refers to polyesters free of internal unsaturation and can include aromatic diacids. These polyesters are well known. They are made by the condensation reactions of saturated low molecular weight diols or blends thereof, said diols containing from 2 to 12 carbon atoms and desirably from 2 to 6 carbon atoms with saturated dicarboxylic acids or their anhydrides or blends of saturated and aromatic dicarboxylic acids or their anhydrides, said dicarboxylic acids or their anhydrides containing from 3 to 12 carbon atoms, desirably 3 to 10, and preferably from 4 to 8 carbon atoms. The dicarboxylic acids or their anhydride components can include up to 49 weight percent of the aromatic dicarboxylic acids or their anhydrides. Blends of diacids or anhydrides are also contemplated. Examples of diols include 1,2-propylene glycol, ethylene glycol, 1,3-propylene glycol, diethylene glycol, di-1,2-propylene glycol, 1,4-butanediol, neopentyl glycol, and the like. Examples of dicarboxylic acid and anhydrides include malonic acid, succinic acid, glutaric acid, adipic acid, pimelic acid, suberic acid, azelaic acid, sebacic acid, isophthalic, terephthalic, phthalic and the anhydride counterparts of the above acids, and the like. Preferred diols are diethylene glycol, ethylene glycol, propylene glycol, and butylene glycol. Preferred dicarboxylic acids are non-aromatic acids such as adipic acid and malonic acid. The condensation reactions to form these polyesters can be run with catalysts such as organotitanates and organo tin compounds such as tetrabutyl titanate or dibutyl tin oxide.

Other useful polyesters for this invention can be made by ring opening polymerizations of cyclic lactones. These polyesters would have from 3 to 6 carbon atoms per repeat unit. Polycaprolactone, a preferred lactone based polymer, is available from Union Carbide.

Aliphatic polycarbonates useful in this invention are saturated and have a molecular weight of from about 200 to about 5,000, desirably from about 200 to about 2,000 or 3,000, and preferably from about 500 to about 1,200. These are suitable polymers to make vinyl-terminated flexibilizers. These are made from esterification or transesterification reactions of phosgene or dialkyl carbonates of phosgene where the alkyls are methyl, ethyl or phenyl, with saturated glycols containing from 2 to 12 carbon atoms and desirably from 2 to 6 carbon atoms. The reactions of esterification and transesterification involving phosgene or its derivatives are well known to organic and polymer chemistry. A preferred reaction product for this invention is 1,6-hexanediol reacted with phosgene to form low molecular weight polymers sold by PPG Industries as Durocarb ™.

The vinyl terminated polyesters and aliphatic polycarbonates lacking internal unsaturation reactive in the free radical crosslinking reactions of unsaturated polyesters of this invention are made by reacting these polyesters or polycarbonates with ethylenically unsaturated molecules having functional groups reactive with the carboxyl or hydroxyl groups on the saturated polycarbonates or polyesters by condensation reactions. Preferably the polyesters or polycarbonates are dihydroxyl terminated such that both terminal groups are hydroxyls. Such material after the terminal unsaturation is attached can be represented as:

X—O—R$^1$—O—X where R$^1$ is the polyester or saturated polycarbonate moiety, O is the oxygen of the polymer, X is the ethylenically unsaturated molecule reacted onto the polymer chain.

Preferably, the terminal unsaturation may be derived from vinylic, styrenic, alpha-methylstyrene, allylic, acrylic, and methacrylic moieties.

The X molecule supplies the terminal unsaturation and is used to link the polyester or polycarbonate backbone to the rest of the unsaturated polyester network during the crosslinking (curing) of the resin composition. Examples of precursors of X are dimethyl-m-isopropenyl benzyl isocyanate, isocyanatoethyl methacrylate, acrylic acid, methacrylic acid, or hydroxy esters of methacrylic or acrylic acid. Another contemplated X molecule is the reaction product of a diisocyanate with a acrylic acid, methacrylic acid, or hydroxy alkyl acrylate or methacrylate. Preferred are hydroxy alkyl acrylates having from 1 to 10 carbon atoms in the alkyl group. Also contemplated is the same moiety made by first reacting the polyester or polycarbonate with the diisocyanate and then reacting that product with the above-referenced derivatives of acrylic or methacrylic acids. The diisocyanates can have from 4 to 20 carbon atoms and be aliphatic or aromatic types. The reactivity of the two isocyanate groups of the diisocyanates can be equivalent or one can be more reactive in the contemplated condensation reactions. Catalysts for the isocyanate hydroxyl reaction can also be used. These catalysts are well known to the urethane art.

When the X molecule is compounds such as acrylic acid, methacrylic acid, or hydroxy esters of methacrylic or acrylic acid, they react with the hydroxyl (or less desirably carboxyl) groups of the polyesters or polycarbonates by typical esterification condensation mechanisms either with or without catalysts. Such catalysts include such compounds as triphenylphosphonium bromide and tetrabutyltitanate. As with any transesterification, the reaction rate is increased by higher temperatures such as 50° C. to 150° C. and the equilibrium is shifted towards the desired product by distilling off the esterification by-products.

The following paragraphs will briefly describe the standard unsaturated polyester compositions with which the vinyl-terminated flexibilizer polymers (made from saturated polyesters or polycarbonates) previously described are coreacted.

The unsaturated polyester resin compositions can be any thermosetting polyester molding composition, especially those described in the article by E. Melby and J. Castro entitled "Glass-reinforced Thermosetting Polyester Molding: Materials and Processing" in vol. 7 of *Comprehensive Polymer Science* published by Pergamon Press: Oxford, 1989, pp. 51-109.

Preferred amounts of the various components in a polyester molding composition is best expressed in parts by weight. These will be based upon 100 parts by weight of the unsaturated polyester resin or vinyl ester resin and ethylenically unsaturated monomers. Commercially, many of the unsaturated polyesters and low profile additives are sold as solutions in styrene. However, for clarity, all the amounts specified below and in the claims will be amounts by weight of the chemical compound and will not include solvents or diluents unless otherwise noted.

The unsaturated polyester is desirably from about 25 to about 60 parts and preferably from about 30 to about 50 parts by weight. The ethylenically unsaturated monomer is desirably from about 40 to about 75 parts and preferably from about 40 to about 65 parts by weight. The low profile additive is desirably present up to about 40 parts, and preferably from about 10 to about 30 parts by weight.

The vinyl terminated saturated/aromatic polyesters or saturated polycarbonates free of internal reactive unsaturation can be present from about 1 parts to about 50 parts, desirably from about 5 to about 40 parts, and preferably from about 10 to about 30 parts by weight based on the standard resin or polymer forming components to an unsaturated polyester resin.

Suitable unsaturated polyester resins which can be utilized in the present invention are well known to the art and to the literature and include products of the condensation reaction of low molecular weight diols (that is, diols containing from 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain ethylenical unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is 1,2-propylene glycol. Mixtures of diols may also be advantageously used. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, terephthalic acid, isophthalic acid, adipic acid, glutaric acid, and the like. The condensation reactions are catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043, which is hereby fully incorporated by reference. Typically, the polyesters are made by interpolymerization of maleic arthydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e., from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3. An excess of oxirane is preferred in the preparation of the polyesters so that the final product has a low content of carboxylic acid end groups and a high content of hydroxyl end groups.

In the preparation of the unsaturated polyesters from oxiranes and anhydrides, small amounts of initiators are utilized as from about 5 to about 30 parts by weight per 100 parts by weight of the polyester forming monomers. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, with the like, as described in U.S. Pat. No. 3,538,043 which is hereby fully incorporated by reference. Regardless of whether an unsaturated polyester made from an oxirane or a diol is utilized, the molecular weight thereof is from about 500 to about 10,000 and preferably from about 1,000 to about 5,000.

Another important component is an ethylenically unsaturated monomer or crosslinking agent such as a polymerizable vinyl or allyl compound, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methyl acrylate, ethyl acrylate, and the like; and other unsaturated monomers including vinyl acetate, diallyl maleate, diallyl fumarate, and the like. Mixtures of the above compounds can also be utilized. The preferred ethylenically unsaturated monomer is styrene and mixtures of styrene and other monomers where styrene is at least 50 weight percent, desirably 75 weight percent, and preferably 85 weight percent of the ethylenically unsaturated monomers.

Fibers can be added to the composition for added strength and stiffness. Examples of fibers which can be utilized in this invention generally include any reinforcing fiber such as glass, aramid, nylon, polyester, graphite, boron, and the like. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class is chopped strands, random or wound continuous filaments or rovings, reinforcing mats, nonreinforcing random mats, fiber bundles, yarns, non-woven fabrics, etc. Coated fiber bundles, comprising about 5 to about 50 or 150 strands, each having about 10 to about 50 fibers, highly bonded together with a conventional sizing agents such as various amino silanes, are preferred. Chopped glass fibers are preferred with a desirable length of 0.5" to 2.0" and preferably 1".

The fiber structure may be randomly distributed within the matrix or be arranged in selected orientations such as in parallel or cross plies or arranged in mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Optionally, various other components or additives can be utilized to form the molding compound composition. For example, various thermoplastic polymers (low profile or low shrinkage compounds) can be utilized. Typical low profile compounds include polyvinyl acetate, saturated polyesters, polyacrylates or polymethacrylates, saturated polyester urethanes, and the like.

Other additives which can also be utilized are known to the art and to the literature and include internal mold release agents such as zinc stearate; viscosity reducers or viscosity modifiers; free radical inhibitors; mineral fillers such as calcium carbonate, Dolomite, clays, talcs, zinc borate, perlite, vermiculite, hollow glass, solid glass microspheres, hydrated alumina, and the like. Viscosity modifiers can be compounds such as MgO dispersions that thicken the unsaturated polyester resins during aging. The mold release agent and viscosity modifiers are used in effective amounts. The typical viscosity reducers used in this specification are long chain aliphatic monocarboxylic acids or saturated polyesters with acid groups. The fillers can be present from 0 to about 80 weight percent, and desirably from 20–70 weight percent of the total composition weight. Free radical inhibitors are included to modify cure cycles by providing cure delay and moderating the cure exotherm. These free radical inhibitors can be present from 0.001 to 0.2 parts per 100 parts by weight of unsaturated polyester resins or vinyl ester resins and ethylenically unsaturated monomers in the composition. The free radical inhibitors include benzoquinone, hydroquinone, and similar substituted quinones.

In addition to unsaturated polyesters, other suitable matrix materials include vinyl ester resins. The general structure of a typical vinyl ester resin, whose size can vary depending on the number of monomer units, is

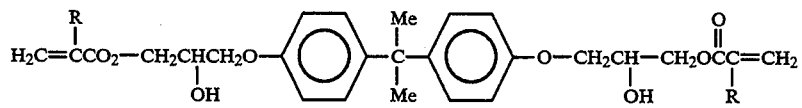

where R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be crosslinked with styrene in the same fashion as an unsaturated polyester. These vinyl ester resins can be used as a partial or full replacement for the unsaturated polyester resin previously specified.

Conventional catalysts can be used to cure the composition. Examples of such catalysts for the cure of unsaturated polyester or vinyl ester resins include organic peroxides and hydroperoxides such as benzoyl peroxide, dicumyl peroxide, cumene hydroperoxide, tert-butylperbenzoate, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like. When curing is done in a mold at elevated temperatures, then the temperature can desirably vary from about 30° C. to about 160° C. and is preferably from about 80° C. to about 150° C. Alternatively, when photo sensitive agents are used, lower temperatures can be used. The amount of catalyst used can vary from about 0.1 to about 5 parts and is desirably 0.5 to about 2.0 parts by weight per 100 parts of resins and polymer forming components in the composition.

The general procedure for mixing the polyester networks involves dissolving the unsaturated polyester, the vinyl-terminated polyesters or aliphatic polycarbonates free from internal reactive unsaturation, and the other polymeric components in the ethylenically unsaturated monomer. The composition is then well mixed. The catalyst for the free radical crosslinking reaction can be added to the mix at any of the various stages so long as the temperature of the mix is not so high as to start free radical crosslinking. Fillers can also be added at this stage.

The vinyl-terminated saturated polyesters and aliphatic saturated polycarbonates of this invention are generally soluble and compatible with the unsaturated polyester and the ethylenically unsaturated monomers. Thus, after curing the blend of vinyl-terminated polyesters or polycarbonates with the unsaturated polyester resin or vinyl ester resins and ethylenically unsaturated monomers, they are generally homogeneous or one phase.

Compositions made in accordance with the invention can be utilized in wet layup, resin transfer molding, filament winding, bulk molding, sheet molding, thick molding, and the like. The composite material of the invention provides a toughened molding material having better crack resistance (i.e., higher strain to failure) and can be molded automotive body panels, automotive structural components (such as load bearing support members), aircraft components, housings for various electrical and household goods, sporting goods (such as golf club shafts, ATV parts, rackets, etc.).

The following examples show how to make the vinyl terminated polyesters or aliphatic polycarbonates, free from internal reactive unsaturation, of this invention. The examples show how these vinyl-terminated polymers improve the flexibility of typical unsaturated polyester resins without detracting as significantly from the high temperature (100°–150° C.) modulus of the composition as do the commercially available alternative compounds. The compositions are reported first without reinforcing fibers as this simplifies the interpretation of physical tests and gives a true representation of the filled matrix performance. In a later section, the surface quality of fiber reinforced samples is compared. For ease of handling, many of the SMC components are commercially prepared as solutions in styrene and are labelled indicating the weight percent of the component and styrene.

Preparation of VTPE-A

The vinyl-terminated saturated polyesters (VTPE) were prepared by reaction of a hydroxy-terminated polyester with dimethyl-m-isopropenyl benzyl isocyanate (TMI) in the presence of stannous octoate (Dabco ® T9) until the infrared (IR) spectrum of the reaction mixture indicated that the -NCO absorbance band had disappeared. A detailed procedure follows.

In a 1 L resin kettle fitted with reflux condenser and stirrer were combined: 163.8 g Witco Formrez® 33-225 poly(propylene adipate) diol (0.680 eq. —OH), 137.0 g of American Cyanamid TMI (98% pure by NMR, 0.68 moles), and approximately 50 g of dichloromethane as solvent. After thorough mixing, 1 g of Air Products Dabco ® T9 catalyst was added, and the mixture stirred continuously without external heating. The reaction was followed by IR, and after 90 percent conversion of the TMI, the mixture was heated to 40° C. to complete the reaction. The reaction mixture was then stripped of solvent on a rotary evaporator. This product will be designated VTPE-A. The actual reaction of the isocyanate with the polyester takes only 30 minutes to 2 hours.

Preparation of VTPE-B through VTPE-E

Similarly prepared were VTPE-B (from Witco Formrez ® 44-225 poly (1,4-butylene adipate) diol and TMI), VTPE-C (from Witco Formrez ® 11-112 poly(-diethylene adipate) diol and TMI), VTPE-D (from Witco Formrez ® 11-225 poly (diethylene adipate) diol and TMI), and VTPE-E (from Union Carbide TONE TM Diol 210 polycaprolactone diol and TMI). The molecular weight of the polyester diols used in VTPE-A, -B, -D is approximately 500, for VTPE-C it is approximately 1000, and for VTPE-E it is approximately 830. As in the preparation of VTPE-A, the TMI was used in amounts to react with the hydroxyls of the diols on a 1:1 basis. Dabco ® T9 catalyst was used in a similar amount to the VTPE-A preparations.

Preparation of VTPE-F

VTPE-F was prepared from Witco Formrez ® 33-225 by reaction with isocyanatoethyl methacrylate (IEM) using a similar procedure and stoichiometric equivalence of NCO and hydroxyl groups. Formrez ® 33-225 has a molecular weight of 500 and is a diol. VTPE-F is the only vinyl terminated polyester with methacrylate type vinyl termination in these examples.

FORMULATION OF SMC WITH VTPE ADDITIVES

Examples 1–11

The VTPE (vinyl terminated polyesters) samples prepared above were formulated into a sheet molding compound (SMC) paste (suitable for automotive body panels) using the recipe shown in Table 1. The first four components of Table 1 were reduced by either 10 weight percent or 20 weight percent and that amount of one of the experimental VTPE samples of this invention were substituted into the recipe. These substitutions are shown in Table I, columns 3 and 4. This formulation is free of fibers.

The SMC pastes were allowed to mature 24 hours and were then cured in a shear edge panel mold for 60 seconds at 149° C. and 800 psi (149° C. and 5.5 MPa). The examples of cured SMC with the VTPE of this invention were labeled Examples 1–12 in Table 2 and Table 3. A control according to the recipe in Table 1 is also included for comparison of the properties of the SMC.

The initial viscosity of the paste was obtained with a Brookfield Model 2.5 HBT viscometer fitted with a Helipath drive unit. Shrinkage was determined by curing a sample in a cavity mold of known dimension and subsequently measuring the sample. Flexural measurements at room temperature of molded samples were performed according to ASTM D-790 and tensile properties at 150° F. were measured according to ASTM D638-89.

TABLE 1

SMC PASTE RECIPES FOR EXAMPLES 1-12 AND 20-24

| Component | RECIPE (PARTS) | | |
|---|---|---|---|
| | Control | 20% Resins Replacement | 10% Resins Replacement |
| Additive | — | 53.7 | 26.9 |
| 1. Unsaturated Polyester "A" | 132.0 | 105.6 | 118.8 |
| 2. Poly(vinyl acetate) based LPA | 88.5 | 70.8 | 79.6 |
| 3. Styrene | 35.5 | 28.4 | 32.0 |
| 4. Divinylbenzene | 12.5 | 10.0 | 11.2 |
| 5. 10% Benzoquinone/ Diallyl Phthalate (Inhibitor) | 0.5 | 0.5 | 0.5 |
| 6. Tertiary Butyl Peroxy Benzoate | 2.5 | 2.5 | 2.5 |
| 7. Viscosity Reducer "A" | 8.0 | 8.0 | 8.0 |
| 8. Zinc Stearate (Mold Release) | 10.0 | 10.0 | 10.0 |
| 9. Calcium Carbonate (Filler) | 697.0 | 697.0 | 697.0 |
| 10. MgO Dispersion | 13.5 | 13.5 | 13.5 |
| TOTAL: | 1000.0 | 1000.0 | 1000.0 |

- The unsaturated polyester "A" is a commercially available material of approximately 1200-1600 MW comprised of fumarate esters of propylene and other diols and is 65% solids in styrene.
- The poly(vinylacetate) based LPA is 40% weight solids in styrene.
- Viscosity reducer "A" is one of the commercially available ones in this specification.
- The MgO dispersion is 35 weight percent MgO in styrene with a small amount of carrier (dispersing) resins.

tered in a consistent manner to the amount of VTPE present in each formulation. The increases in percent elongation at failure seen from the inclusion of 20 to 10 weight percent VTPE are significant, whereas the decreases in flexural and tensile strengths are still acceptable. Moreover, the addition of the VTPE additives at these levels does not radically increase initial viscosity, and the shrinkage of the cured formulations remains the same as the control sample.

Figure 2:
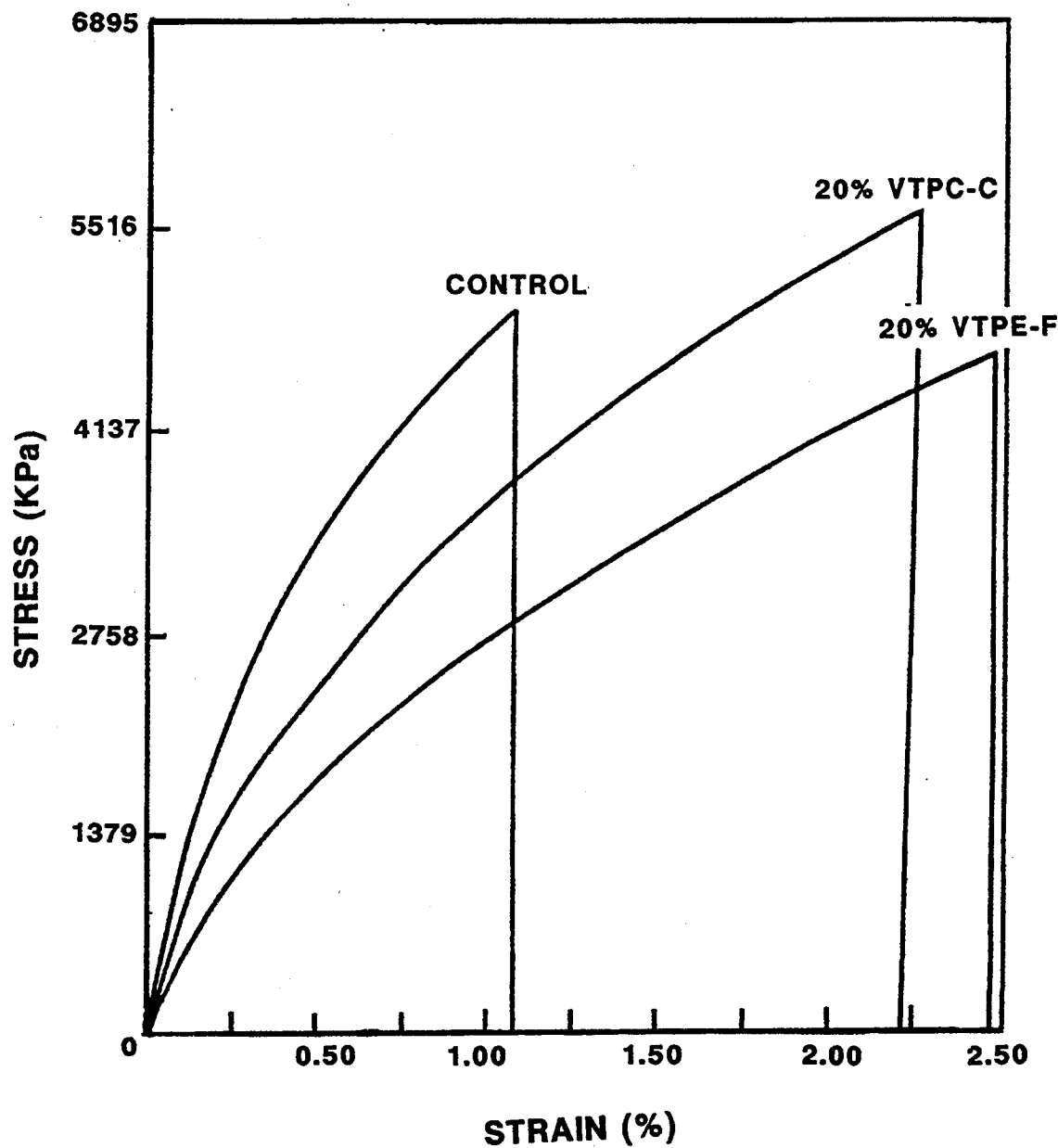

The performance of VTPE-F (Examples 11 and 12) relative to the control is shown in the stress-strain curves in FIGS. 1 and 2. It is easily seen from these figures that the VTPE-F imparts advantages in elongation, crack resistance, and toughness (area underneath each stress-strain curve) to the formulation.

FIG. 1 showing stress-strain data at room temperature and FIG. 2 showing stress-strain data at 300° C. demonstrate how the toughness of the cured SMC (as measured by the area under the stress-strain curve) are greatly increased by the VTPE of this invention. The figures also show how the ultimate tensile strength was not affected by this modification and the modulus was only slightly decreased.

VTPE-A was also formulated into three different SMC paste formulations as shown in Tables 4, 5, and 6, at relatively constant calcium carbonate filler content. VTPE-C was also tested in two of these recipes.

In the recipe in Table 4, component 1 was reduced by 20 weight percent and an equivalent amount of VTPE was substituted into the Examples 13 and 14 of Table 7. In the recipe in Table 5, components 1 and 2 were reduced by 20 weight percent and an equivalent amount of VTPE was substituted into Examples 15 and 16 of Table 8. In the recipe in Table 6, components 1-4 were

TABLE 2

EXAMPLES 1 THROUGH 6

| Vinyl Terminated Polymer | | VTPE-A | | VTPE-B | | VTPE-C | |
|---|---|---|---|---|---|---|---|
| Example | | 1 | 2 | 3 | 4 | 5 | 6 |
| % of Components 1-4 Replaced | Control | 20 | 10 | 20 | 10 | 20 | 10 |
| Initial Viscosity (cps), Avg. | 36,000 | 48,000 | 40,000 | 40,000 | 46,000 | 56,000 | 50,000 |
| Shrinkage on Cure (%), Avg. | 0.06 | 0.04 | 0.05 | — | — | 0.08 | 0.06 |
| Room Temp Properties (Avg.) | ASTM D-790 | | | | | | |
| Flex. Modulus (GPa) | 5.65 | 4.62 | 3.86 | 2.82 | 4.21 | 2.21 | 3.65 |
| Max. Stress (MPa) | 35.2 | 37.6 | 29.0 | 22.5 | 30.1 | 22.1 | 29.2 |
| Max. Strain (%) | 0.84 | 1.36 | 1.20 | 1.64 | 1.07 | 2.10 | 1.28 |
| Rel. Toughness | 1.0 | 1.8 | 1.2 | 1.5 | 1.1 | 1.6 | 1.3 |
| 149° C. Properties (Avg.) | ASTM D638-89 | | | | | | |
| Tensile Strength (MPa) | 4.83 | 4.34 | 4.69 | 3.79 | 4.06 | 4.21 | 3.93 |
| Elongation (%) | 1.05 | 1.50 | 1.76 | 1.57 | 1.07 | 2.12 | 1.32 |
| Rel. Toughness | 1.0 | 1.6 | 2.1 | 1.5 | 1.1 | 2.1 | 2.0 |

TABLE 3

EXAMPLES 7 THROUGH 12

| Vinyl Terminated Polymer | | VTPE-D | | VTPE-E | | VTPE-F | |
|---|---|---|---|---|---|---|---|
| Example | | 7 | 8 | 9 | 10 | 11 | 12 |
| % of Components 1-4 Replaced | Control | 20 | 10 | 20 | 10 | 20 | 10 |
| Initial Viscosity (cps), Avg. | 36,000 | 48,000 | 40,000 | 56,000 | 42,000 | 48,000 | 48,000 |
| Shrinkage on Cure (%), Avg. | 0.06 | 0.04 | 0.07 | | | 0.08 | 0.06 |
| Room Temp Properties (Avg.) | | | | | | | |
| Flex. Modulus (GPa) | 5.65 | 3.59 | 4.69 | 2.28 | 4.48 | 4.00 | 4.69 |
| Max. Stress (MPa) | 35.2 | 25.4 | 31.5 | 22.1 | 31.4 | 31.2 | 33.3 |
| Max. Strain (%) | 0.84 | 1.05 | 1.00 | 1.95 | 1.07 | 1.26 | 1.04 |
| Rel. Toughness | 1.0 | 0.8 | 1.0 | 1.5 | 1.2 | 1.3 | 1.1 |
| 149° C. Properties (Avg.) | ASTM D638-89 | | | | | | |
| Tensile Strength (MPa) | 4.83 | 4.19 | 4.76 | 3.64 | 3.72 | 4.83 | 4.78 |
| Elongation (%) | 1.05 | 1.90 | 1.58 | 1.50 | 1.18 | 2.54 | 2.00 |
| Rel. Toughness | 1.0 | 2.0 | 1.8 | 1.1 | 1.1 | 2.3 | 2.0 |

It can be seen from the data in these Tables 2 and 3 that the properties of the molded composite were alreduced by 20 percent and an equivalent amount of VTPE was substituted into Example 17 of Table 9.

TABLE 4

SMC PASTE FORMULATION - 66% CaCO₃

| Component | Parts/(Weight) | Function |
|---|---|---|
| 1. Unsaturated Polyester "B" | 305.9 | Unsaturated Polyester, Low Profile Additive, Styrene Inhibitor |
| 2. 10% Benzoquinone/Diallyl Phthalate | 0.3 | Inhibitor |
| 3. Irganox ™ 29B75 | 4.0 | Initiator |
| 4. Zinc Stearate | 13.8 | Mold Release |
| 5. CaCo₃ | 661.0 | Mineral Filler |
| 6. MgO Dispersion (35 Wt % in styrene and carrier resins) | 15.0 | Maturation Agent |
| TOTAL: | 1000.0 | |

Unsaturated polyester "B" is a one package unsaturated polyester resin composition containing in addition to an unsaturated polyester of 1200–1600 MW (from propylene diol and other diols and fumaric acid), a LPA, and styrene. The LPA is a polyester-urethane. This unsaturated polyester composition is commercially available.
Irganox ™ 29B75 is a peroxide initiator.

TABLE 5

SMC PASTE FORMULATION 66% CaCO₃

| Component | Parts/(Weight) | Function |
|---|---|---|
| 1. Unsaturated Polyester "C" | 183.0 | Unsaturated Polyester |
| 2. Low Profile Additive "A" | 122.0 | Low Profile Additive |
| 3. 10% Benzoquinone/Diallyl Phthalate | 1.0 | Inhibitor |
| 4. Tertiary Butyl Peroxy Benzoate | 4.5 | Initiator |
| 5. Zinc Stearate | 4.5 | Mold Release |
| 6. Viscosity Reducer "B" | 9.0 | Viscosity Reducer |
| 7. CaCO₃ | 658.0 | Mineral Filler |
| 8. MgO Dispersion (35 wt % in styrene and carrier resins) | 18.0 | Maturation Agent |
| TOTAL: | 1000.0 | |

Unsaturated polyester "C" is of MW approximately 1200–1600 is made from fumaric acid, propylenediol and other diols and is 65 weight percent polyester and 35 weight percent styrene. This type of material is commercially available.
The low profile additive "A" is one of those listed in the specification.
Viscosity reducer "B" is one of the commercially available ones listed in the specification.

TABLE 6

SMC PASTE FORMULATION, 66% CaCO₃

| Component | Parts/(Weight) | Function |
|---|---|---|
| 1. Unsaturated Polyester "A" | 156.9 | Unsaturated Polyester |
| 2. Low Profile Additive "A" | 109.0 | Low Profile Additive |
| 3. Styrene | 16.4 | Cross-linker, Solvent |
| 4. Divinylbenzene | 14.8 | Cross-linker, Solvent |
| 5. 10% Benzoquinone/Diallyl Phthalate | 0.8 | Inhibitor |
| 6. Tertiary Butyl Peroxy Benzoate | 3.0 | Initiator |
| 7. Lupersol ™ 256 Peroxide Initiator | 1.5 | Initiator |
| 8. Zinc Stearate | 12.1 | Mold Release |
| 9. Viscosity Reducer "A" | 10.0 | Viscosity Reducer |
| 10. CaCO₃ | 659.5 | Mineral Filler |
| 11. MgO Dispersion (35 wt % in styrene and carrier resins) | 16.0 | Maturation Agent |

TABLE 6-continued

SMC PASTE FORMULATION, 66% CaCO₃

| Component | Parts/(Weight) | Function |
|---|---|---|
| TOTAL: | 1000.0 | |

The unsaturated polyester "A" is of MW approximately 1200–1600 made from propylene diol and other diols and fumaric acid. It is 65 wt % polyester and 35 weight percent styrene. It is commercially available.
Low profile additive "A" is one of those listed in the specification.
Viscosity reducer "A" is one of the commercially available ones listed in the specification.

The SMC pastes were allowed to mature 24 hours and were then cured in a shear edge panel mold 60 seconds at 149° C. and 5.5 MPa pressure.

TABLE 7

MOLDED SMC PROPERTIES FOR EXAMPLES 13, 14, AND THEIR CONTROL RECIPE FROM TABLE 4

| Example | | 13. | 14. |
|---|---|---|---|
| Vinyl Terminated Polymer | | VTPE-A | VTPE-C |
| % Components 1 replaced by Example VTPE | Control —0% | 20 wt % | 20 wt % |
| Room Temp. Properties (Avg.) | ASTM D-790 | | |
| Flex. Modulus (GPa) | 5.93 | 5.52 | 4.90 |
| Max. Stress (MPa) | 42.5 | 41.9 | 37.1 |
| Max. Strain (%) | 0.89 | 1.01 | 1.10 |
| 149° C. Properties (Avg.) | ASTM D638-89 | | |
| Tensile Strength (MPa) | 8.39 | 6.58 | 5.52 |
| Elongation (%) | 1.27 | 1.72 | 1.46 |

TABLE 8

MOLDED SMC PROPERTIES FOR EXAMPLES 15, AND 16, AND THEIR CONTROL RECIPE FROM TABLE 5

| Example | | 15. | 16. |
|---|---|---|---|
| Vinyl Terminated Polymer | | VTPE-A | VTPE-C |
| % Components 1 and 2 replaced by Example VTPE | Control —0% | 20 wt % | 20 wt % |
| Room Temp. Properties (Avg.) | ASTM D-790 | | |
| Flex. Modulus (GPa) | 5.72 | 4.07 | 2.76 |
| Max. Stress (MPa) | 38.2 | 31.9 | 28.0 |
| Max. Strain (%) | 0.79 | 1.20 | 1.93 |
| 149° C. Properties (Avg.) | ASTM D638-89 | | |
| Tensile Strength (MPa) | 5.63 | 4.90 | 4.39 |
| Elongation (%) | 0.81 | 1.40 | 1.68 |

TABLE 9

MOLDED SMC PROPERTIES FOR EXAMPLE 17 AND ITS CONTROL RECIPE FROM TABLE 6

| Example | | 17. |
|---|---|---|
| Vinyl Terminated Polymer | | VTPE-A |
| % Components 1, 2, 3 and 4 replaced by Example VTPE | Control —0% | 20 wt % |
| Room Temp. Properties (Avg.) | ASTM D-790 | |
| Flex. Modulus (GPa) | 4.82 | 2.76 |
| Max. Stress (MPa) | 31.7 | 21.4 |
| Max. Strain (%) | 0.81 | 1.10 |
| 149° C. Properties (Avg.) | ASTM D638-89 | |
| Tensile Strength (MPa) | 4.45 | 5.12 |
| Elongation (%) | 1.05 | 1.78 |

The results shown indicate that the vinyl-terminated materials novel to this invention have utility in many unsaturated polyester formulations, and impart similar advantages, such as increased maximum strain values with only minimal drop in flexural modulus, to each SMC.

COMPARATIVE FORMULATIONS OF SMC WITH COMMERCIAL VTBNX

Comparative Examples 18 and 19

Hycar ™ 1300X43, also known as VTBNX, from B.F. Goodrich, is a trifunctional methacrylate-terminated butadiene-acrylonitrile liquid rubber additive of the type commonly used for improving the toughness of epoxy systems. This material functions by forming a dispersed rubber phase during cure. VTBNX was formulated in the standard recipe described in Table 1, at levels of 10 and 5 weight percent. The results of moldings containing this material are given in Table 10.

TABLE 10

COMPARATIVE EXAMPLES 18 AND 19
OF MOLDED SMC AND THEIR CONTROL

| Comparative Example | Control | 18. | 19. |
|---|---|---|---|
| VTBNX (% of Components 1-4) Replaced | | 10 | 5 |
| Initial Viscosity (cps), Avg. | 36,000 | 90,000 | 60,000 |
| Room Temp. Properties (Avg.) | ASTM D-790 | | |
| Flex. Modulus (GPa) | 5.65 | 5.17 | 5.45 |
| Max. Stress (MPa) | 35.2 | 36.7 | 37.9 |
| Max. Strain (%) | 0.84 | 1.09 | 1.01 |
| 149° C. Properties (Avg.) | ASTM D638-89 | | |
| Tensile Strength (MPa) | 4.83 | 5.88 | 5.34 |
| Elongation (%) | 1.05 | 1.37 | 1.22 |

The VTBNX of the comparative examples 18 and 19 offers only modest advantages in terms of room temperature mechanical property of maximum strain, and at high temperatures offers, only modest increases in elongation and tensile strength. The physical properties can be compared to those in Table 1 using the vinyl terminated polymers of this invention. The shrinkage observed is significant with these materials, rendering the moldings prepared from this material unacceptable for use in exterior automotive body panels. Moreover, VTBNX is not phase-stable over time in solutions of unsaturated polyester and styrene, nor in the SMC's prepared from them. This makes the VTBNX of the comparative examples inferior to the materials of this invention.

FORMULATIONS OF SMC WITH VTPC ADDITIVES

Vinyl-terminated saturated aliphatic polycarbonates (VTPC's) were prepared similar to the procedure described for VTPE samples above. An aliphatic polycarbonate diol was reacted with TMI using equivalent mole amounts of isocyanate and hydroxyls in the presence of stannous octoate, until the -OH absorbance in the IR spectrum had disappeared. Polycarbonate diols used to prepare these materials were the Duracarb ™ diols available from PPG Industries. VTPC-A was prepared from Duracarb ™ 120 (MW 850) and VTPC-B from Duracarb ™ 124 (MW 2000). Both Duracarbs ™ are made from phosgene and 1,6-hexane diol.

Poly(diethylene glycol carbonate) diol was prepared by reacting diethylene glycol (311g, 2.93 moles) with diethylcarbonate (288g, 2.44 moles) in the presence of tetrabutyltitanate catalyst (0.6g). These components were mixed under an argon atmosphere and heat to reflux (82° C.) for ten hours. The reaction mixture was cooled to room temperature and 10 mm of Hg vacuum was applied to remove volatiles. The contents were then heated (final pot temperature 180° C.) until the volatiles were removed. A titration of an aliquot gave a hydroxyl number of 163 indicating a molecular weight of 611.

The above poly(diethylene glycol carbonate) diol product was dissolved in 158g of methylene chloride, to which was added 194.5 of TMI (0.93 moles of NCO) and 0.4 g of Dabco ® T-9 catalyst. It was calculated that there was 0.93 mole of hydroxyls in the diol. The sample was heated to reflux and stirred until no further isocyanate groups could be detected by FTIR. Then the methylene chloride was stripped under vacuum to yield the VTPC-C.

Examples 20 through 24

The VTPC modifiers were formulated in the recipe found in Table 1 by reducing the amount of components 1–4 of that recipe and substituting the vinyl terminated polymers of this invention in the weight percent shown.

VTPC-A (Examples 20 and 21) were formulated at 10 and 5 weight percent, VTPC-B (Example 22) was formulated at 5 weight percent, and VTPC-C (Examples 23 and 24) was formulated at 20 and 10 weight percent. The results of the evaluation of the molded samples are shown in Table il.

It can be seen from the data in Table 11 that the properties of the molded samples were altered in a consistent way by the addition of the VTPC modifier. The increases in percent elongation at failure are significant, and the decreases in flexural and tensile strengths are still acceptable. Moreover, the addition of the VTPC modifier at these concentrations does not radically increase the initial viscosity of the formulation, and the shrinkage of the cured sample is essentially the same as the control.

TABLE 11

MOLDED SMC PROPERTIES FOR EXAMPLES 20. THROUGH 24.
AND THEIR CONTROL RECIPE FROM TABLE 1

| Example | | 20. | 21. | 22. | 23. | 24. |
|---|---|---|---|---|---|---|
| Vinyl Terminated Polymer | | VTPC-A | VTPC-A | VTPC-B | VTPC-C | VTPC-C |
| % of Components 1-4 Replaced | Control | 10 wt % | 5 wt. % | 5 wt % | 20 wt % | 10 wt % |
| Initial Viscosity (cps), Avg. | 36,000 | 52,000 | 42,000 | 52,000 | 24,000 | 24,000 |
| Shrinkage on Cure (%), Avg. | | 0.06 | 0.08 | 0.05 | 0.21 | 0.14 |
| Room Temp Properties (Avg.) | ASTM D-790 | | | | | |
| Flex. Modulus (GPa) | 5.65 | 4.62 | 5.31 | 4.48 | 4.82 | 6.07 |
| Max. Stress (MPa) | 35.2 | 30.8 | 36.1 | 30.7 | 32.5 | 39.2 |
| Max. Strain (%) | 0.84 | 0.96 | 0.98 | 1.00 | 0.94 | 0.83 |
| Rel. Toughness | 1.0 | 1.0 | 1.2 | 1.1 | 1.0 | 1.0 |
| 149° C. Properties (Avg.) | ASTM D638-89 | | | | | |
| Tensile Strength (MPa) | 4.83 | 4.29 | 4.75 | 4.72 | 5.45 | 4.65 |
| Elongation (%) | 1.05 | 1.52 | 1.10 | 1.27 | 2.00 | 1.56 |

TABLE 11-continued

MOLDED SMC PROPERTIES FOR EXAMPLES 20. THROUGH 24.
AND THEIR CONTROL RECIPE FROM TABLE 1

| Example | 20. | 21. | 22. | 23. | 24. |
|---|---|---|---|---|---|
| Rel. Toughness | 1.0 | 1.6 | 1.4 | 1.5 | 2.3 | 1.6 |

The performance of VTPC-C (Examples 23 and 24) relative to the control is shown in the stress-strain curves in FIGS. 1 and 2. It is easily seen from these Figures the advantages in elongation, crack resistance, and toughness (area underneath each stress-strain curve) that the VTPC-C imparts to the formulation.

Formulations of SMC with Duracarb TM 120 Additive

Comparative examples presented in Table 12 are test data from samples formulated with 20 or 10 weight percent of Duracarb TM 120 alone, without TMI termination. These are labeled Comparative Examples 25 and 26. It can be seen by comparison of the data for VTPC-A (Examples 20 and 21) which used Duracarb TM 120 with Examples 25 and 26 which used Duracarb TM 120, that the vinyl termination present in the VTPC (or VTPE) is an essential component of the materials for retention of flexural modulus, strength, and high temperature tensile strength and improved elongation.

Preparation of SMC with Fiberglass

The vinyl terminated polymers of this invention were incorporated into the recipes of Table 1 and Table 6 to which were added one inch chopped fiberglass strands during the SMC preparation process. The weight percent fiberglass in the composition was between 27 and 30 weight percent based on the components in the recipe and the fiberglass. To demonstrate the effect of these vinyl terminated polymers on surface quality, the Ashland Index was determined using a Loria TM Surface Analyzer available from Ashland Chemical. This piece of equipment measures short-term variations in surface quality associated with high shrinkage in SMC compounds during molding. Smaller Ashland Number(s), indicate smoother (lower waviness) surface(s) on the panel being analyzed. The values on several samples are shown in Table 13. The recipe from Table 1 uses the same unsaturated polyester as the recipe in Table 6, but the recipe in Table 1 has a higher filler to polymer ratio and a different low profile additive. The first column in Table 13 shows the sample identification. The samples showing a weight percent are SMC formulations wherein the first 4 components of Table 1 or 6 have been re-placed with an equivalent weight percent of a VTPE-D, VTPC-A, or VTBNX. VTPE-D and VTPC-A are this invention. VTBNX is a vinyl terminated butadiene acrylonitrile copolymer of the prior art, available from B. F. Goodrich as Hycar TM 1300×43.

TABLE 12

COMPARATIVE EXAMPLES 25 AND 26
OF MOLDED SMC AND THEIR CONTROL

| Comparative Example Using Duracarb 120 Additive | | 3. | 4. |
|---|---|---|---|
| (% of Components 1–4 Replaced) | Control | 20 | 10 |
| Room Temp. Properties (Avg.) | ASTM D-790 | | |
| Flex. Modulus (GPa) | 5.65 | 2.00 | 2.13 |
| Max. Stress (MPa) | 35.2 | 14.6 | 16.9 |
| Max. Strain (%) | 0.84 | 1.28 | 1.34 |
| Rel. Toughness | 1.0 | 0.8 | 0.9 |

TABLE 12-continued

COMPARATIVE EXAMPLES 25 AND 26
OF MOLDED SMC AND THEIR CONTROL

| Comparative Example Using Duracarb 120 Additive | | 3. | 4. |
|---|---|---|---|
| 149° C. Properties (Avg.) | ASTM D638-89 | | |
| Tensile Strength (MPa) | 4.83 | 2.04 | 2.77 |
| Elongation (%) | 1.05 | 1.00 | 1.13 |
| Rel. Toughness | 1.0 | 0.8 | 0.9 |

TABLE 13

LORIA TM SURFACE SMOOTHNESS
ON FIBERGLASS REINFORCED SMC

| | Recipe | Ashland Index |
|---|---|---|
| Control | Table 1 | 73 |
| 15 wt. % VTPE-D | Table 1 | 70 |
| 10 wt. % VTPC-A | Table 6 | 77 |
| 5 wt. % VTBNX | Table 1 | 172 |

All wt. % values are the amounts of vinyl terminated polymers (VTPE, VTPC, or VTBNX) used, based on the first 4 components of Table 1 or Table 6. The first 4 components of Table 1 or Table 6 were reduced by the wt. % of vinyl terminated polymers stated so that the amounts of the other components remained unchanged and the ratio of polymer to filler remains unchanged.

Table 13 shows that the vinyl terminated polymers of this invention can be substituted for unsaturated polyesters and other components in the recipe at the 10 wt. % and 15 wt. % level and still develop good Loria TM Ashland Index values. The VTBNX, even at the low level of 5 wt. %, gives a Loria Ashland Index value indicating that this type of modification is unacceptable for automotive body panels.

Loria Ashland Index values of greater than 100 can be visually observed as unacceptable smoothness in painted automotive body panels for some applications.

While in accordance with the Patent Statutes, the best mode and preferred embodiment has been set forth, the scope of the invention is not limited thereto, but rather by the scope of the attached claims.

What is claimed is:

1. A polymer resin composition comprising:
   a) an unsaturated polyester resin or vinyl ester resin, said unsaturated polyester resin being derived from a condensation reaction of diols having 2 to 12 carbon atoms and dicarboxylic acids or their anhydrides having 3 to 12 carbon atoms and provided that at least 50 mole percent of the dicarboxylic acids and their anhydrides contain ethylenical unsaturation, said vinyl ester resin being derived from a reaction of epoxy resins of 2,2'-bis(hydroxyphenyl)propane with acrylic or methacrylic acids,
   b) ethylenically unsaturated monomers, and
   c) about 1 to about 50 parts by weight of a vinyl-terminated polyester or vinyl-terminated aliphatic polycarbonate or mixtures thereof per 100 parts by weight of a and b, said vinyl-terminated polyester and said vinyl-terminated aliphatic polycarbonate being substantially free of internal unsaturation reactive in free radical crosslinking reactions of unsaturated polyesters and having an average molecular weight from about 500 to less than 2,000.

2. A polymer composition of claim 1, wherein the components are present in the following amounts:
   a) from about 25 to about 60 parts by weight of said unsaturated polyester resin or said vinyl ester resins;
   b) from about 40 to about 75 parts by weight of said ethylenically unsaturated monomers;
   c) from about 1 to about 50 parts by weight of said vinyl-terminated polyester or said vinyl-terminated aliphatic polycarbonate based on 100 parts by weight of a and b, and
   d) an amount up to about 40 parts by weight of a low profile additive resin.

3. A polymer composition of claim 2, wherein said polymer composition includes from about 0 to about 80 percent by weight inorganic filler and about 5 to about 85 percent by weight fibrous reinforcing agent based upon the composition of claim 2 with filler and reinforcing agent.

4. A polymer composition of claim 3, wherein the amount of a) is from about 35 to about 50 parts by weight and the amount of b) is from about 40 to about 65 parts, and wherein said ethylenically unsaturated monomers are at least 75 percent by weight styrene.

5. A polymer composition of claim 3, wherein said vinyl-terminated polyester or said vinyl-terminated aliphatic polycarbonate are present in amounts from about 5 to about 40 parts by weight.

6. A polymer composition of claim 5, wherein said vinyl-terminated polyester is the reaction product of a polyester and ethylenically unsaturated molecule having functional groups reactive with carboxyl or hydroxyl groups by condensation mechanisms, and wherein said polyester is the condensation product of adipic acid and diethylene glycol, ethylene glycol, or propylene glycol or blends thereof, or said polyester is the reaction product of ring opening polymerization of cyclic lactones.

7. A polymer composition according to claim 6, wherein said ethylenically unsaturated molecule having functional groups reactive with carboxyl or hydroxyl groups by condensation mechanisms is dimethyl-m-isopropenyl benzene isocyanate, isocyanatoethyl methacrylate, acrylic acid, methacrylic acid, or a hydroxy ester of methacrylic or acrylic acid.

8. A polymer composition of claim 5, wherein the vinyl-terminated polymer is a vinyl-terminated polycarbonate which is the reaction product of a polycarbonate with ethylenically unsaturated molecule having functional groups reactive with carboxyl or hydroxyl groups by condensation mechanisms and wherein said polycarbonate is the reaction product from phosgene or a dialkyl ester of phosgene reacted with an aliphatic diol having from 2 to 6 carbon atoms.

9. A polymer composition according to claim 8, wherein said ethylenically unsaturated molecule reactive with hydroxyl or carboxyl groups is dimethyl-m-isopropenyl benzyl isocyanate, isocyanatoethylmethacrylate, acrylic acid, methacrylic acid or a hydroxy ester of methacrylic or acrylic acid.

10. A polymer composition according to claim 9, wherein said aliphatic diol is 1,6-hexane diol.

11. A cured molding compound comprising; the cured reaction product of at least:
   a) an unsaturated polyester resin or vinyl ester resin, said unsaturated polyester resin being derived from a condensation reaction of diols having 2 to 12 carbon atoms and dicarboxylic acids or their anhydrides having 3 to 12 carbon atoms and provided that at least 50 mole percent of the dicarboxylic acids and their anhydrides contain ethylenical unsaturation, said vinyl ester resin being derived from a reaction of epoxy resins of 2,2'-bis(hydroxyphenyl)propane with acrylic or methacrylic acids;
   b) ethylenically unsaturated monomers; and
   c) from about 1 to about 50 parts by weight of a vinyl-terminated polyester or vinyl-terminated aliphatic polycarbonate based on 100 parts of a and b, wherein the average molecular weight of said vinyl-terminated polyester or said vinyl-terminated aliphatic polycarbonate is from about 500 to less than 2,000, and wherein said vinyl-terminated polyester and said vinyl-terminated polycarbonate are substantially free from internal unsaturation reactive in free radical crosslinking reactions of unsaturated polyesters.

12. A cured molding compound of claim 11, wherein at least 75 weight percent of said ethylenically unsaturated monomers b, are styrene, wherein said molding compound includes an inorganic filler and reinforcing fibers, and wherein reaction product includes up to 40 parts by weight of a low profile additive.

13. A cured molding compound of claim 12, wherein the average molecular weight of said vinyl-terminated polyester or said vinyl-terminated aliphatic polycarbonate is from about 500 to about 2,000.

14. A cured molding compound of claim 11, wherein the vinyl group of said vinyl-terminated polymer is the reaction product of dimethyl-m-isopropenyl benzyl isocyanate, allyl, esters of acrylic or esters of methacrylic acids.

15. A cured molding compound of claim 14, wherein said molding compound includes an inorganic filler and reinforcing fibers and wherein the amounts of unsaturated polyester resin or vinyl ester resin is from about 25 to about 60 parts by weight and the amount of ethylenically unsaturated monomers b) is from about 40 to about 75 parts by weight.

16. A cured molding compound of claim 15, wherein said a, b, and c components form a one phase molding compound upon curing and wherein said cured molding compound is an automotive body panel.

17. A cured molding compound of claim 11, wherein said vinyl-terminated polyesters or said vinyl-terminated aliphatic polycarbonate is the reaction product of an acrylic acid, methacrylic acid, or a hydroxy alkyl acrylate wherein said alkyl of said hydroxy alkyl acrylate has from 1 to 8 carbon atoms with the reaction product of diisocyanates with a saturated polyester or aliphatic polycarbonate.

18. A cured molding compound of claim 11, wherein said vinyl-terminated polyester or said vinyl-terminated aliphatic polycarbonate is the reaction product of a polyester or a polycarbonate reacted with dimethyl-m-isopropenyl benzyl isocyanate or isocyanoethyl methacrylate.

19. A cured molding compound of claim 15, including a low profile additive in an amount of from about 10 to about 40 parts by weight for every 100 parts by weight of a and b.

20. A cured molding compound of claim 19, wherein said reinforcing fiber is chopped fiberglass and wherein greater than 80 percent of said ethylenically unsaturated monomers are styrene monomers.

21. A cured molding compound of claim 20, wherein said vinyl-terminated polyester or vinyl-terminated aliphatic polycarbonate is an aliphatic polyester made from a saturated diacid glycol with 2 to 6 carbon atoms.

22. A process for toughening unsaturated polyester resin compositions comprising:
   incorporating from about 1 to about 50 parts by weight of a vinyl-terminated polyester or a vinyl-terminated aliphatic polycarbonate into 100 parts by weight of ethylenically unsaturated monomers and an unsaturated polyester resin or a vinyl ester resin, said unsaturated polyester resin being derived from a condensation reaction of diols having 2 to 12 carbon atoms and dicarboyxlic acids or their anhydrides having 3 to 12 carbon atoms and provided that at least 50 mole percent of the dicarboxylic acids and their anhydrides contain ethylenical unsaturation, said vinyl ester resins being derived from a reaction of epoxy resins of 2,2'-bis(-hydroxyphenyl)propane with acrylic or methacrylic acids to form a composition, and co-curing said composition by free radical mechanism forming a polymer network, wherein said vinyl-terminated polyester and aliphatic polycarbonate are free from internal unsaturation reactive in free radical crosslinking reactions of unsaturated polyesters and have an average molecular weight of from 500 to less than 2,000.

23. A process according to claim 22, wherein the amount of vinyl-terminated polyester and vinyl-terminated aliphatic polycarbonate is from about 5 to about 35 parts by weight per 100 parts by weight of ethylenically unsaturated monomers and unsaturated polyester or vinyl ester resins.

24. A polymer resin composition comprising:
   (a) from about 25 to about 60 parts by weight of an unsaturated polyester resin or vinyl ester resin, said unsaturated polyester resin being derived from a condensation reaction of diols having 2 to 12 carbon atoms and dicarboxylic acids or their anhydrides having 3 to 12 carbon atoms and provided that at least 50 mole percent of the dicarboxylic acids and their anhydrides contain ethylenical unsaturation, said vinyl ester resin being derived from the reaction epoxy resins of 2,2'-bis(hydroxyphenyl) propane with acrylic or methacrylic acid,
   (b) from 40 to 75 parts by weight of ethylenically unsaturated monomers,
   (c) from about 5 to 40 parts by weight of a vinyl-terminated aliphatic polycarbonate per 100 parts by weight of (a) and (b), said vinyl-terminated polycarbonate being substantially free of internal unsaturation reactive in free radical crosslinking reactions of unsaturated polyesters and having an average molecular weight of from about 500 to 3,000,
   (d) up to about 40 parts by weight of a low profile additive, and
   (e) from 5 to 85 percent by weight of a fibrous reinforcing agent based on the weight of the composition,
wherein said vinyl-terminated aliphatic polycarbonate is the reaction product of phosgene or a dialkyl ester of phosgene reacted with an aliphatic diol having from 2 to 6 carbon atoms, which is then reacted through condensation reactions with dimethyl-m-isopropenyl benzyl isocyanate, isocyanato-ethylmethylacrylate, acrylic acid, methacrylic acid, or a hydroxy ester of methacrylic or acrylic acid.

25. A polymer composition according to claim 24, wherein said aliphatic diol of said vinyl-terminated aliphatic polycarbonate is 1,6-hexane diol.

* * * * *